(12) United States Patent
Laws

(10) Patent No.: US 6,918,287 B2
(45) Date of Patent: Jul. 19, 2005

(54) METHOD AND APPARATUS FOR MEASURING THE ACCELERATION OF AN ENGINE

(76) Inventor: James M. Laws, 34826 LaPlace Ct., Eustis, FL (US) 32736

( * ) Notice: Subject to any disclaimer, the term of this patent is extended or adjusted under 35 U.S.C. 154(b) by 0 days.

(21) Appl. No.: 10/647,185

(22) Filed: Aug. 25, 2003

(65) Prior Publication Data

US 2005/0044933 A1 Mar. 3, 2005

(51) Int. Cl.$^7$ .............................................. G01M 15/00
(52) U.S. Cl. ..................................................... 73/116
(58) Field of Search ........................ 73/112, 116, 117.1, 73/117.2, 117.3, 118.1, 119 R

(56) References Cited

U.S. PATENT DOCUMENTS

| | | | |
|---|---|---|---|
| 2,362,308 A | | 11/1944 | Roberts |
| 3,285,057 A | | 11/1966 | Zurik |
| 3,505,863 A | | 4/1970 | Lucia |
| 4,511,112 A | * | 4/1985 | Ruehle ........................ 248/544 |
| 4,691,288 A | | 9/1987 | Kay et al. |
| 4,758,967 A | | 7/1988 | Shmuter et al. |
| 4,939,985 A | * | 7/1990 | Von Thun .................. 73/118.1 |
| 4,984,988 A | * | 1/1991 | Mizushina et al. ......... 434/380 |
| 4,995,139 A | * | 2/1991 | Suzuki ........................ 73/116 |
| 5,515,712 A | * | 5/1996 | Yunick ............................ 73/9 |
| 5,531,107 A | * | 7/1996 | Ganzhorn, Jr. ................ 73/117 |
| 5,986,545 A | * | 11/1999 | Sanada et al. .............. 340/439 |
| 6,405,585 B1 | * | 6/2002 | Hewitt ........................ 73/116 |
| 2001/0039832 A1 | * | 11/2001 | Sondey ........................ 73/116 |
| 2002/0018982 A1 | * | 2/2002 | Conroy ........................ 434/62 |
| 2004/0040374 A1 | * | 3/2004 | Nakanishi et al. ............ 73/116 |
| 2004/0059555 A1 | * | 3/2004 | Schoeggl ........................ 703/8 |

* cited by examiner

Primary Examiner—Eric S. McCall
(74) Attorney, Agent, or Firm—William M. Hobby, III

(57) ABSTRACT

An apparatus for measuring the acceleration of an engine for use in a race car for matching the engine to the car for a particular racetrack and includes an engine test stand having a base and an inertia shaft mounted thereto coupled to a gear box. The test stand includes an engine cart for mounting the engine thereto and positionable for coupling the engine to the gear box and has a plurality of selectively engageable inertia wheels attached thereto. The method includes mounting an engine to the engine cart and positioning the engine cart for alignment with the gear box coupling the engine to the gear box. The engine is then accelerated through a predetermined RPM range so that measurements of elapsed time at preselected RPMs can be determined and a selected load to simulate a racetrack length.

8 Claims, 3 Drawing Sheets

METHOD AND APPARATUS FOR MEASURING THE ACCELERATION OF AN ENGINE

BACKGROUND OF THE INVENTION

The present invention relates to an apparatus and method of measuring the acceleration of an engine and especially to a method of measuring acceleration of an engine under selected loads to simulate a racetrack's length.

This invention relates to an apparatus and method for measuring acceleration that is particularly suitable for testing race car engines and matching the engine to the car for a particular racetrack and the engine can be used to measure elapsed time at preselected RPMs under selected loads to simulate racetrack lengths. Normally, engines are tested on dynamometers by mounting the engine on a test stand and running the engine so as to measure the output shaft power or torque under controlled conditions. The dynamometer provides a means of absorbing the energy developed by the prime mover and for measuring the output energy. Instruments are connected to different portions of the engine in order to supply information with respect to temperature of different parts, pressures in the intake manifold or combustion chambers of an internal combustion engine, back pressure at the exhaust and the like. Dynamometers are costly and delicate devices which must be maintained in good operating condition for proper operation and interpretation of test data.

Prior U.S. Patents can be seen in the Roberts U.S. Pat. No. 2,362,308, for an Apparatus for Testing Prime Movers which connects a prime mover to a shaft which can have the rear end loaded with weights hanging from the shaft on a radial arm. The Lucia U.S. Pat. No. 3,505,863, is a Method and Apparatus for Testing the Acceleration of Prime Movers in which the output shaft is coupled to a flywheel of known inertia which is driven and accelerated from a first predetermined angular velocity to a second predetermined velocity. The time taken for accelerating the flywheel is measured and the average torque developed by the prime mover is derived from the time taken to accelerate the flywheel. The invention includes a test stand in which the prime mover may be tested while a second prime mover is being installed or connected and for comparing the torque developed by a prime mover to the torque of a reference prime mover.

The Kay et al. U.S. Pat. No. 4,691,288, is a Torque Sensor for Internal-Combustion Engines. A method and apparatus for providing a signal representative of the output torque of an internal combustion engine utilizes a correlation of average engine speed and variations in instantaneous subcyclic engine speed. The R. R. De Zurik U.S. Pat. No. 3,285,057, is an Apparatus for Obtaining Torque Measurements, such as a torsional forces applied to a constantly rotating shaft. The Shmuter et al. U.S. Pat. No. 4,758,967, is a Computer Simulated Inertia for Motor Vehicle Powertrain Testing and includes an output motor driven shaft having an inertia disc mounted thereto in an output motor in order to simulate normal driving conditions in a test stand.

SUMMARY OF THE INVENTION

An apparatus for measuring the acceleration of an engine for use in a race car for matching the engine to the car for a particular racetrack and includes an engine test stand having a base and an inertia shaft mounted thereto coupled to a gear box. The test stand includes an engine cart for mounting the engine thereto and positionable for coupling the engine to the gear box and has a plurality of selectively engageable inertia wheels attached thereto. The method includes mounting an engine to the engine cart and positioning the engine cart for alignment with the clutch system coupling the engine to the gear box. The engine is then accelerated through a predetermined RPM range so that measurements of elapsed time at preselected RPMs can be determined and a selected load to simulate a racetrack length.

BRIEF DESCRIPTION OF THE DRAWINGS

Other objects, features, and advantages of the present invention will be apparent from the written description and the drawings in which.

DESCRIPTION OF THE PREFERRED EMBODIMENT

Figure 1:
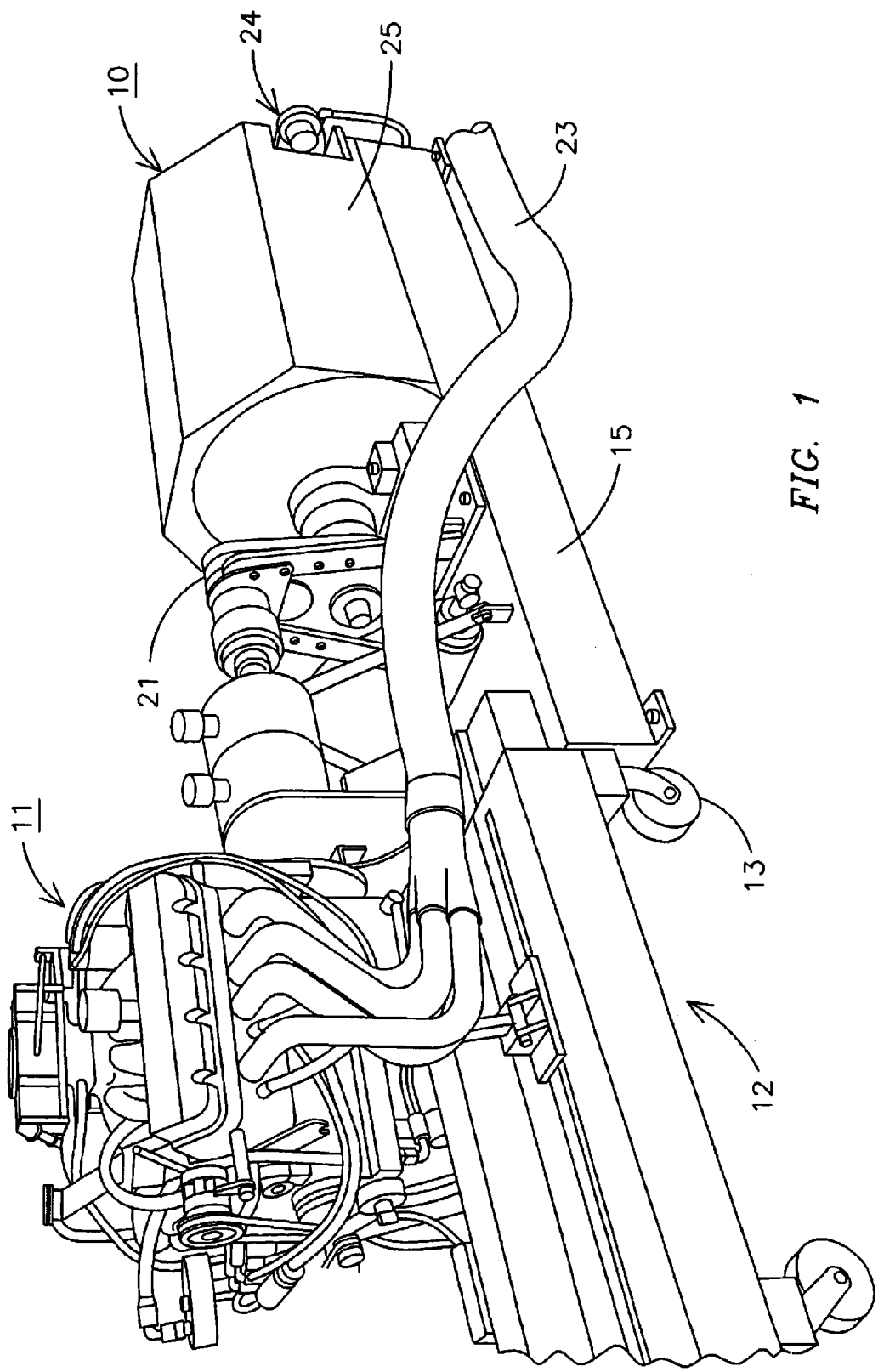
FIG. 1 is a perspective view of an apparatus for measuring the acceleration of an engine and attached engine.
Figure 2:
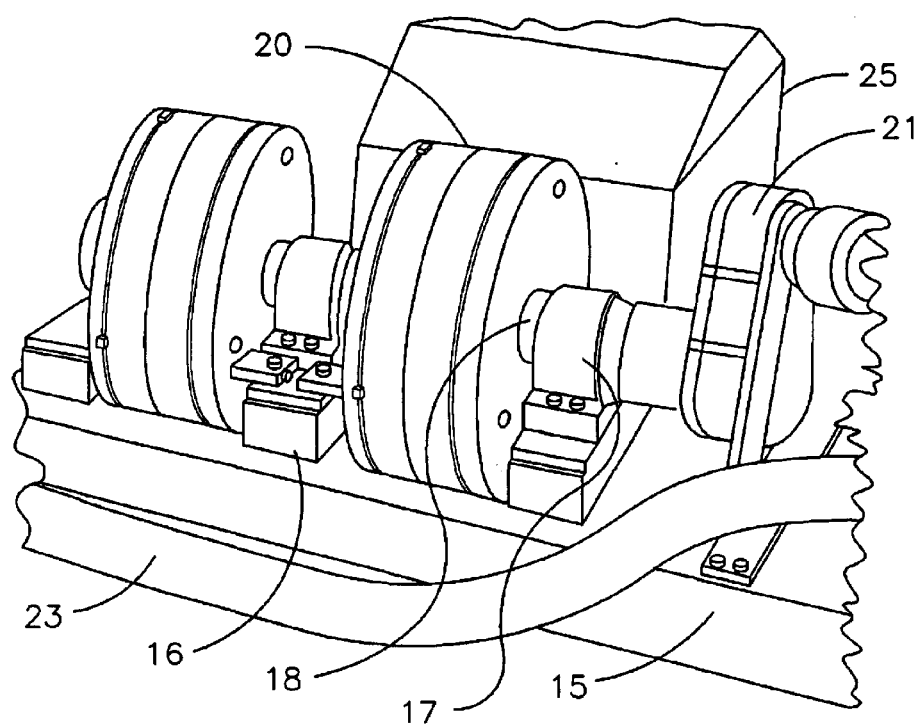
FIG. 2 is a perspective view of a portion of the apparatus of FIG. 1 showing the inertia wheels.
Figure 4:
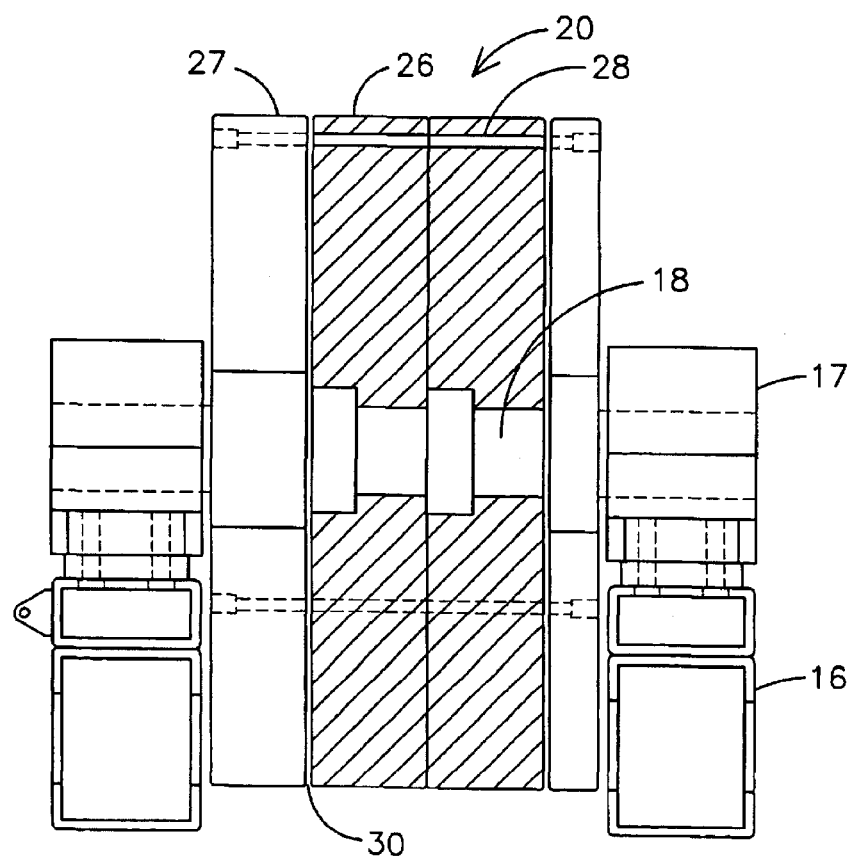
FIG. 4 is a sectional view taken through one section of the inertia wheels.
Figure 3:
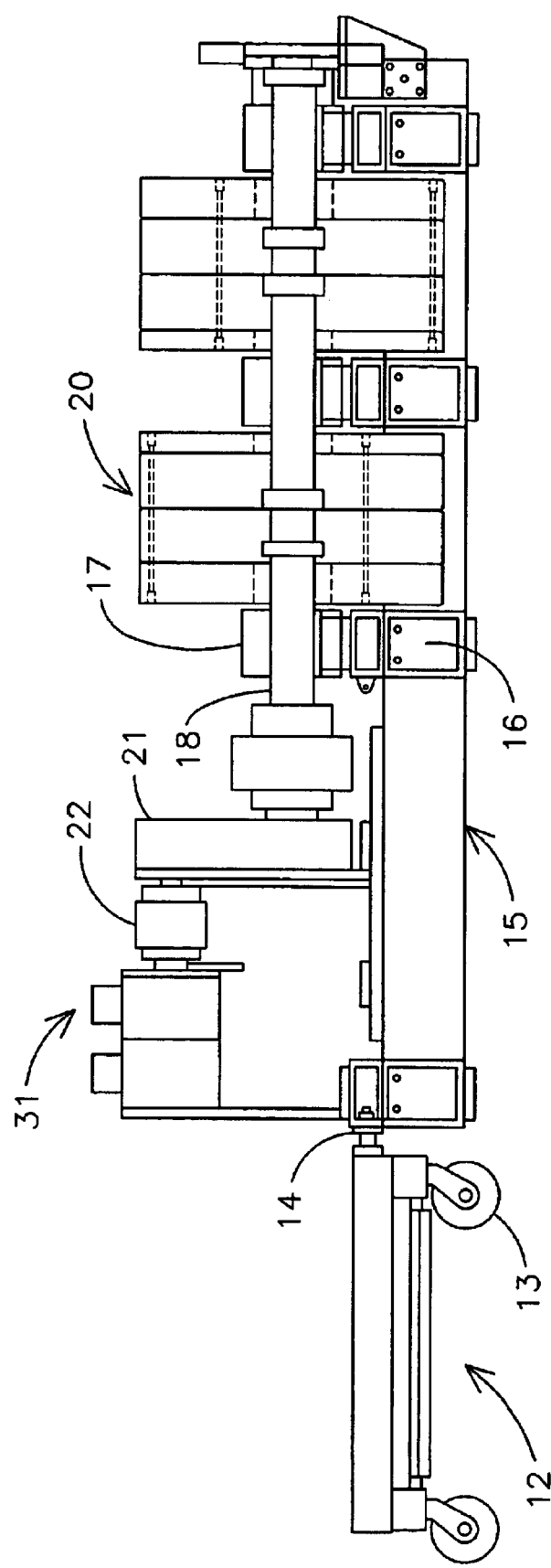
FIG. 3 is a side elevation of the apparatus for measuring the acceleration of an engine.

Referring to the drawings FIGS. 1–4, an acceleration measuring apparatus 10 has an engine 11 mounted thereto in Figure 1. The engine is mounted to an engine cart 12 which has wheels 13 to roll the cart 12 and the engine 11 into position for attaching the engine to the acceleration measuring apparatus 10. The cart 12 has an aligning cone 14 shown in FIG. 3 which is pushed into an opening in the supporting base frame 15 for aligning the cart in a proper position for attaching the crank shaft of the engine 11 to the drive shaft of the acceleration measuring apparatus 10. The acceleration measuring apparats 10 base 15 has general support frame members 16 supporting a plurality of journals 17 which in turn supports an inertia wheel supporting shaft 18. The inertia supporting shaft 18 holds a plurality of inertia wheels 20 aligned in two banks, as seen in FIG. 2. The inertia supporting shaft 18 is in turn connected to a gear box 21 which is connected to the shaft coupling 22 which in turn allows a connection to the engine 11 crank shaft. An exhaust pipe 23 has been connected to the engine header so as to feed the exhaust gases from the room in which the engine is being tested. The inertia wheel housing 24 has an inertia wheel cover 25 which is shown in FIG. 1 and in an open position in FIG. 2 exposing the inertia wheels 20. The number of inertia wheels 20, as seen in FIG. 4, can include a plurality of main wheels 26, which are always fully engaged to the shaft, and a plurality of floating inertia wheels 27, all mounted to the inertia wheel shaft 18 and selectively engageable thereto and having a plurality of elongated bolts 28 extending through the floating inertia wheels 27 and the main inertia wheels 26. The floating inertia wheels are readily engaged or disengaged to the other wheels in order to adjust the inertia placed on the shaft 18. The shaft 18 is connected through the gear box 21 and couplings to the engine 11 50 that the engine 11, when running, produces a rotation of the crank shaft which rotates the inertia wheels 20 which simulate a load through a chosen RPM range for recording the elapsed times at various RPM points. The inertia wheels are engaged or disengaged from the shaft 18 to simulate different race tracks lengths so that the engine can be matched to a race car for different race tracks. An air gap 30 is positioned between the floating inertia wheels 27 and the main inertia wheels 26 to allow the floating or slipping of the floating wheels on the shaft 18. A plurality of sensors 31 are connected to the output of the crank shaft of the engine 11 and can be connected to the engine as desired for measuring velocity acceleration specifically for recording elapsed times and various RPM points. The inertia wheels can then selectively engaged or disengaged to simulate a specific race track length for race tracks so that the engine can be easily tested prior to mounting in a vehicle to simulate the combination of an engine with a particular racing vehicle and race track.

In operation, the engine 11 is mounted to an engine cart 12 and is then aligned and connected to the acceleration testing apparatus 10 with the exhaust pipe 23 connected to the headers of the engine 11. The inertia wheels 20 are then selectively engaged or disengaged to adjust the inertia for a particular vehicle that the engine is to be placed in. The engine is then started and accelerated through a predetermined RPM range simulating a particular race track and measuring the elapsed times and preselected RPMs so that the acceleration of the engine can be recorded under selected loads to simulate race track lengths.

It should be clear at this time that an apparatus and a method of measuring the acceleration of an engine have been provided for modifying an engine to a specific vehicle for use on a specific length of race track. However, the present invention should not be considered as limited to the forms shown which are to be considered illustrative rather than restrictive.

I claim:

1. A method of measuring acceleration of an engine comprising the steps of:

selecting an engine test stand having a base having an inertia shaft mounted thereto and coupled to a gear box, said engine test stand also having an engine cart for mounting an engine thereto and positionable for coupling said engine to said gearbox, said inertia shaft having selectively engaging inertia wheels attached thereto;

mounting an engine to said engine cart;

positioning said engine cart for alignment of an said engine with said gear box;

coupling said engine to said gear box;

starting said engine;

accelerating said mounted engine through a predetermined RPM range; and measuring elapsed times at preselected RPMs; whereby acceleration of an engine can be recorded under selected loads to simulate race track lengths.

2. Apparatus for measuring acceleration of an engine comprising:

a base;

an inertia shaft rotatably mounted to said base;

a gear box attached to said base and coupled to said inertia shaft;

an engine mounting cart, having means for removably attaching an engine thereto;

a plurality of inertia wheels selectively engageable to said inertia shaft for rotation therewith; and at least one sensor mounted for reading the rotation of said inertia shaft so that elapsed times can be measured at preselected RPM points during acceleration of an engine; whereby acceleration of an engine can be recorded under selected loads to simulate race track lengths.

3. The apparatus for measuring acceleration of an engine in accordance with claim 2 in which said plurality of inertia wheels includes at least one floating inertia wheel mounted on bearings on said shaft.

4. The apparatus for measuring acceleration of an engine in accordance with claim 2 in which each of said plurality of inertia wheels has a generally cylindrical shape.

5. The apparatus for measuring acceleration of an engine in accordance with claim 2 having a plurality of sensors mounted for reading the rotation of said inertia shaft.

6. The apparatus for measuring acceleration of an engine in accordance with claim 2 in which said engine cart has a plurality of wheels for rolling said cart and mounted engine into place for coupling to said gear box.

7. The apparatus for measuring acceleration of an engine in accordance with claim 6 in which said engine cart has means for attaching said cart to said base.

8. The apparatus for measuring acceleration of an engine in accordance with claim 5 in which one of said plurality of sensors is mounted for reading the RPMs of said engine crankshaft.

* * * * *